(12) United States Patent
Noguchi et al.

(10) Patent No.: US 6,372,095 B1
(45) Date of Patent: Apr. 16, 2002

(54) METHOD FOR DECOMPOSING BROMIC ACID BY PHOTOCATALYST AND APPARATUS THEREFOR

(75) Inventors: Hiroshi Noguchi, Tokyo; Rie Kagami, Kawasaki; Shigeo Sato; Miyoko Kusumi, both of Tokyo, all of (JP)

(73) Assignee: Kabushiki Kaisha Meidensha, Tokyo (JP)

( * ) Notice: Subject to any disclaimer, the term of this patent is extended or adjusted under 35 U.S.C. 154(b) by 0 days.

(21) Appl. No.: 09/391,464

(22) Filed: Sep. 8, 1999

(30) Foreign Application Priority Data

Sep. 8, 1998 (JP) .......................................... 10-253152
Sep. 8, 1998 (JP) .......................................... 10-253153

(51) Int. Cl.$^7$ .......................... C01B 7/00; C01B 13/00; B01J 19/08; B01D 17/06
(52) U.S. Cl. .............................. 204/157.48; 204/157.5; 204/158.2; 422/186; 210/748
(58) Field of Search .................... 204/157.48, 157.5, 204/158.2; 422/186; 210/748

(56) References Cited

U.S. PATENT DOCUMENTS 5,330,661 A * 7/1994 Okuda et al. ............... 210/748

FOREIGN PATENT DOCUMENTS

JP 61-18494 * 1/1986

OTHER PUBLICATIONS

Kurokawa et al., JNCI, vol. 77, No. 4, (1986), pp. 977–982 No month available.

Asami et al., "Mizu Kankyo Gakki–shi", vol. 19 11, (1996), pp. 930–396 No month available.

Miyata et al., "Suido Kyokai Zasshi", vol. 66, No. 3, (1997), pp. 16–25 No month available.

Mills et al., "Bromate Removal from Drinking Water by Semiconductor Photocatalysis", Water Res. (1996), vol. 30, No. 9, pp. 1973–1978 abstract only. no month available.*

* cited by examiner

Primary Examiner—Edna Wong
(74) Attorney, Agent, or Firm—Foley & Lardner

(57) ABSTRACT

The invention relates to a method for decomposing bromate ions contained in a liquid. The method includes the sequential steps of bringing the liquid into contact with a photocatalyst; and irradiating the photocatalyst with a light ray having an energy that is not lower than that of a band gap of the photocatalyst, thereby generating a photocatalytic reaction to decompose the bromate ions. The invention further relates to an apparatus for decomposing bromate ions contained in a liquid. The apparatus includes a first section for generating therein a photocatalytic reaction to decompose the bromate ions; a photocatalyst adapted to be brought into contact with the liquid in the first section; and a light source for irradiating the photoacatalyst with the light ray such that the photocatalytic reaction is generated in the first section when the photocatalyst is in contact with the liquid.

17 Claims, 13 Drawing Sheets

METHOD FOR DECOMPOSING BROMIC ACID BY PHOTOCATALYST AND APPARATUS THEREFOR

BACKGROUND OF THE INVENTION

The present invention relates to a method for decomposing bromic acid, that is, bromate ions contained in a liquid, using a photocatalyst, and an apparatus for the decomposition.

Kurokawa et al. (1986) JNCI, Vol. 77, No. 4, pp. 977–982 describes carcinogenicity of potassium bromate. Bromate ion ($BrO_3^{31}$) can be generated by dissolving potassium bromate in water. Bromate ion can also be produced as a by-product by oxidizing bromide ion ($Br^-$) dissolved in water, in the ozonization or accelerated oxidation treatment of drinking water. Bromate ion is classified by IARC (International Agency for Research on Cancer) as. Group 2B of having the possibility of carcinogenicity. In Japan, ozonization has increasingly been used in purification of drinking water in order to eliminate bad smell of drinking water or to reduce the amount of trihalomethane generated as a by-product by disinfection with chlorine. Thus, much attention has been drawn to bromate ion due to its carcinogenicity. The permissible bromate ion concentration of drinking water was set to 25 $\mu g/L$ by WHO. U.S. Environmental Protection Agency has proposed a permissible bromate ion concentration of 10 $\mu g/L$ at the first stage of Disinfectant/Disinfection By-product Rule (D/DBPrule) and may propose a stricter concentration at the second stage of D/DBPrule.

Asami et al. (1996) "Mizu Kankyo Gakkai-shi", Vol. 19, No. 11, pp. 930–936 describes bromate ion formation inhibition by coexisting organic matters in ozonation process. Miyata et al. (1997) "Suido Kyokai Zasshi", Vol. 66, No. 3, pp. 16–25 describes the removal of bromate ion by particulate activated carbon. Particulate activated carbon, however, may become deteriorated in the removal of bromate ion, as the activated carbon adsorbs thereon dissolved organic matter and the like. The deteriorated activated carbon may require the replacement with new one or reactivation. Furthermore, it has been proposed to suppress the formation of bromate ion by strictly controlling the amount of ozone to be injected into drinking water.

The amount of bromate ion generated by ozonization is known to be substantially in proportion to CT value that is the product of the concentration (C) of dissolved ozone and the ozonization time (T). On the other hand, the degree of disinfection is substantially in proportion to CT value. Thus, CT value is required to be at least a predetermined minimum value in order to have a sufficient disinfection. FIG. 16 shows the change of bromic ion concentration with ozone injection rate by black circles and the change of C*T10 with ozone injection rate by white circles, for destroying Giardia. As shown in FIG. 16, CT value becomes sufficient to destroy Giardia when the ozone injection rate is at least 1.8 mg/L. Under this condition, the bromate ion concentration becomes about 3 $\mu g/L$. It may be difficult to avoid the generation of a certain amount of bromate ion in order to sufficiently disinfect drinking water.

SUMMARY OF THE INVENTION

It is therefore an object of the present invention to provide a method for efficiently and stably decomposing bromate ions contained in a liquid by a photocatalytic reaction.

It is another object of the present invention to provide an apparatus therefor.

According to the present invention, there is provided a method for decomposing bromate ions contained in a liquid. This method comprises bringing the liquid into contact with a photocatalyst; and irradiating the photocatalyst with a light ray having an energy that is not lower than that of a band gap of the photocatalyst, thereby generating a photocatalytic reaction to decompose the bromate ions.

According to the present invention, there is provided an apparatus for decomposing bromate ions contained in a liquid. This apparatus comprises a first section for generating therein a photocatalytic reaction to decompose the bromate ions; a photocatalyst adapted to be brought into contact with the liquid in the first section; and a light source for irradiating the photocatalyst with the light ray such that the photocatalytic reaction is generated in the first section when the photocatalyst is in contact with the liquid.

DESCRIPTION OF THE PREFERRED EMBODIMENTS

Figure 1:
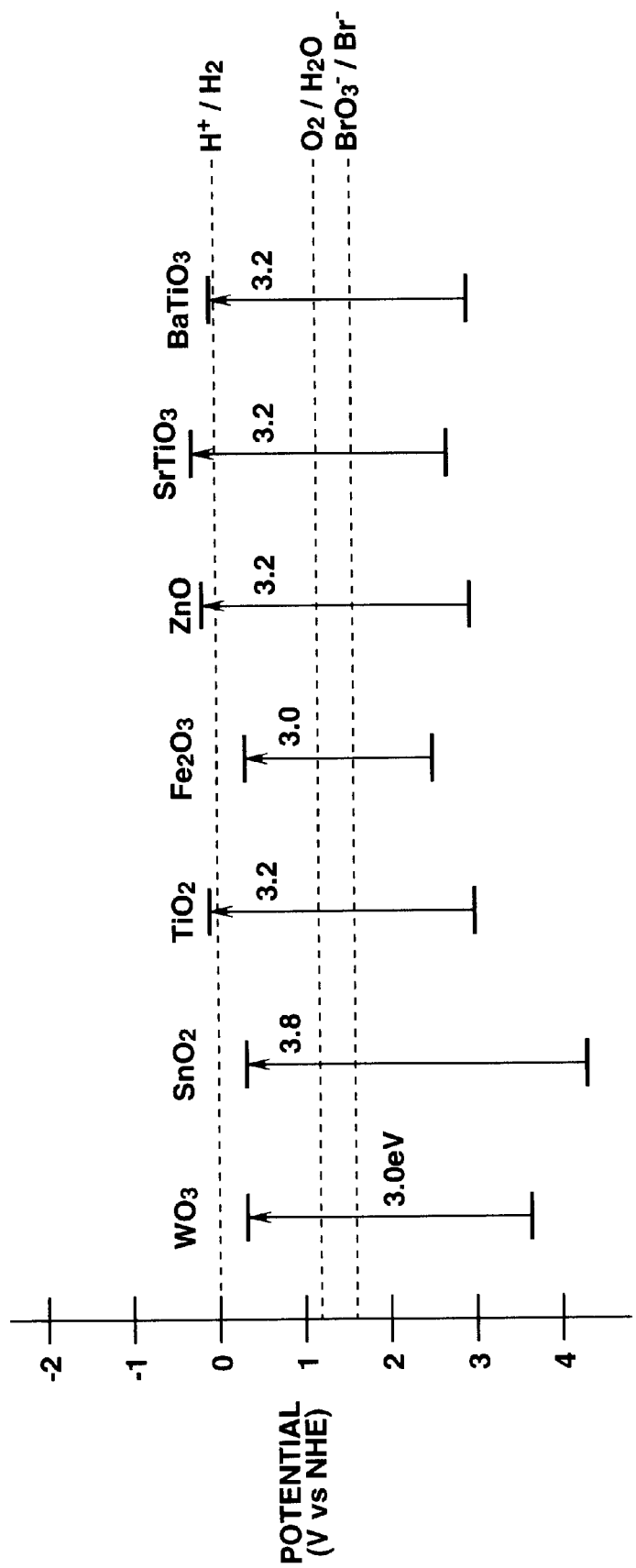
FIG. 1 is a graph showing the band gaps of exemplary metal oxide catalysts.

When a photocatalyst is irradiated with a light ray having an energy that is not lower than that of a band gap of the photocatalyst, electrons are excited from the valence band to the conduction band, thereby generating holes at the valence band. The excited electrons have a reducing potential, and the holes have an oxidizing potential. As shown in FIG. 1, $TiO_2$ as a photocatalyst has a band gap of about 3 eV, and an oxidation-reduction reaction proceeds by irradiating $TiO_2$ with an ultraviolet ray with wavelengths lower than 410 nanometers (nm).

It is possible to decompose bromate ions by reducing them with electrons on a photocatalyst. Table 1 shows oxidation-reduction potentials of $BrO_3^-/Br^-$ and water molecule and energy levels Of electron on $TiO_2$ and hole on $TiO_2$.

TABLE 1

| | Oxidation-Reduction Potential or Energy Level E (V vs. NHE) | Reaction Formula |
|---|---|---|
| $TiO_2(e-)$ | −0.54 | |
| $2H^+/H_2$ | 0.000 | $H_2 = 2H^+ + 2e^-$ |
| $O_2/H_2O$ | 1.228 | $2H_2O + 4h^+ = O_2 + 4H^+$ |
| $BrO_3^-/Br^-$ | 1.423 | $Br^- + 3H_2O = BrO_3^- + 6H^+ + 6e^-$ |
| $TiO_2(h^+)$ | 2.66 | |

If the electron potential energy level of a photocatalyst is lower than the oxidation-reduction potential of $BrO_3^-/Br^-$, the reduction of bromate ions will proceed. In fact, as shown in Table 1, the electron potential energy level of $TiO_2$ is lower than the oxidation-reduction potential of $BrO_3^-/Br^-$. Therefore, the following reaction (1) will proceed on the electron side.

$$BrO_3^- + 6H^+ + 6e^- \rightarrow Br^- + 3H_2O \quad (1)$$

In contrast, as shown by the reaction formula (2), water is oxidized on the hole side, if there exists no dissolved substance (e.g., organic matter) reactive with holes.

$$2H_2O + 4h^+ \rightarrow O_2 + 4H^+ \quad (2)$$

Thus, the following reaction (3) will proceed in total.

$$2BrO_3^- \rightarrow 2Br^- + 3O_2 \quad (3)$$

If there exists, for example, 2-propanol as such dissolved substance, the following reaction (4) will proceed on the hole side.

$$(CH_3)_2CHOH + h^+ \rightarrow (CH_3)_2C.OH + H^+ \quad (4)$$

Thus, the following reaction (5) will proceed in total.

$$BrO_3^- + 6(CH_3)_2CHOH \rightarrow Br^{31} + 6(CH_3)_2C.OH + 3H_2O \quad (5)$$

It is possible to decompose bromate ions by the action of electrons, regardless of the type of the dissolved substance.

Figure 2:
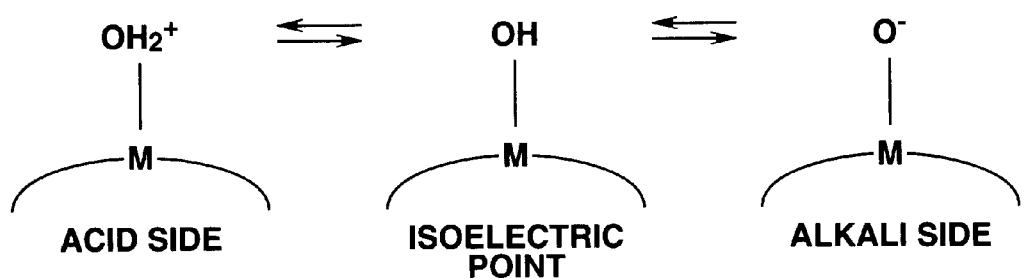
FIG. 2 is a schematic view showing the change of charge condition of a photocatalyst depending on pH.

FIG. 1 shows the band gaps of exemplary photocatalysts (oxides), each being capable of decomposing bromate ions. In order to conduct this decomposition, it is necessary that the surface of an oxide (photocatalyst) is positively charged. In this condition, bromate ions, which are negatively charged, are adsorbed to the oxide and then are decomposed by electrons generated by the light irradiation. As shown in FIG. 2, if pH is lower than isoelectric point of an oxide, the oxide surface becomes positively charged. In contrast, if pH is higher than that, it becomes negatively charged. Thus, it is necessary to make pH of a liquid lower than the isoelectric point of an oxide contained in the liquid, in order to decompose bromate ions. Table 2 shows exemplary oxides and their respective isoelectric points.

TABLE 2

| Oxide | Isoelectric Point |
|---|---|
| $WO_3$ | 0.43 |
| $SiO_2$ | 1.0–2.0 |

TABLE 2-continued

| Oxide | Isoelectric Point |
|---|---|
| $MnO_2$ | 3.9–4.5 |
| $SnO_2$ | 5–6 |
| $TiO_2$ | 5–6 |
| $\gamma Fe_2O_3$ | 6.5–6.9 |
| $ZrO_2$ | 6.7 |
| $Cr_2O_3$ | 6.5–7.5 |
| $Al_2O_3$ | 7.0–9.0 |
| $\alpha Fe_2O_3$ | 8.4–9.0 |
| $ZnO$ | 8.7–9.7 |
| $SrTiO_3$ | 8.6 |
| $BaTiO_3$ | 9.9 |
| $MgO$ | 12.1–12.7 |

Table 3 shows a group of photocatalysts, which are capable of decomposing bromate ions under acid condition, and another group of photocatalysts, which are capable under neutral condition (pH of about 7). Furthermore, it is possible to decompose bromate ions, if a photocatalyst is irradiated with a light ray with a wavelength that is not longer than the threshold wavelength for photocatalytic reaction, which is shown in Table 3.

TABLE 3

| Condition for Bromate Decomposition | Photo-Catalyst | Isoelectric Point | Band Gap (eV) | Threshold Wave-Length for Photo-Catalytic Reaction (nm) |
|---|---|---|---|---|
| Acid Condition | $WO_3$ | 0.43 | 2.8 | 388 |
| | $SnO_2$ | 5–6 | 3.8 | 326 |
| | $TiO_2$ | 5–6 | 3.2 | 388 |
| | $\gamma Fe_2O_3$ | 6.5–6.9 | 2.3 | 539 |
| Neutral Condition | $\alpha Fe_2O_3$ | 8.4–9.0 | 2.3 | 539 |
| | $ZnO$ | 8.7–9.7 | 3.2 | 388 |
| | $SrTiO_3$ | 8.6 | 3.2 | 388 |
| | $BaTiO_3$ | 9.9 | 3.2 | 388 |

Figure 3:
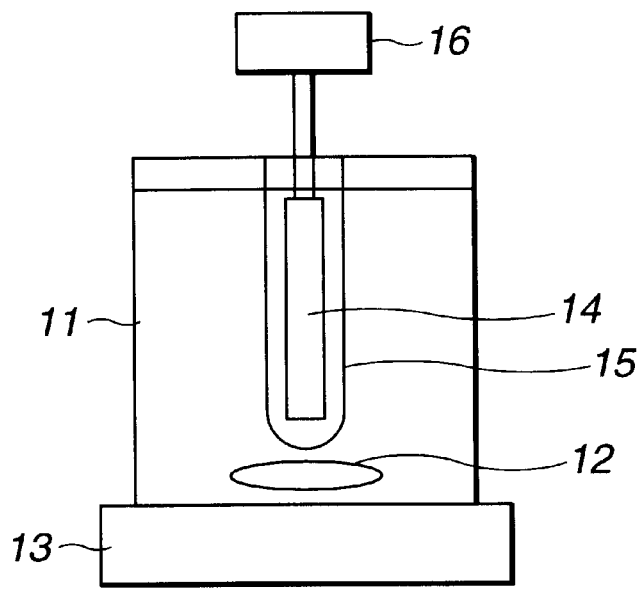
FIG. 3 is a schematic view showing an apparatus according to a first preferred embodiment of the invention.

FIG. 3 shows an apparatus according to a first preferred embodiment of the invention for decomposing bromate ions contained in a liquid. This apparatus has (1) a first section (batch-type photocatalytic reaction vessel) 11 for receiving therein a bromate-ion-containing liquid (water), (2) a magnetic stirrer 13 for stirring the liquid by rotating a rotary member 12, (3) a light source 14 for emitting a light ray having an energy that is not lower than that of the band gap of a photocatalyst, and (4) a tube 15 for protecting the light source 14. The light source 14 is kept switched on using a stabilizer 16. In order to decompose bromate ions, pH of the liquid may be adjusted to not higher than isoelectric point of the photocatalyst, depending on the type of photocatalyst (see Table 3). Then, the liquid is introduced into the vessel 11 so that the tube 15 is immersed in the liquid. Then, a photocatalyst, which is in the form of powder or carried on a carrier (e.g., glass), is kept suspended in the liquid by energizing the stirrer 13 to rotate the rotary member 12. Under this condition, the above light ray is emitted from the light source 14 in order to generate the photocatalytic reaction to decompose bromate ions. With this emission, the above-mentioned reaction (1) will proceed, and thereby bromate ions ($BrO_3^-$) are decomposed into bromide ions ($Br^-$).

Figure 4:
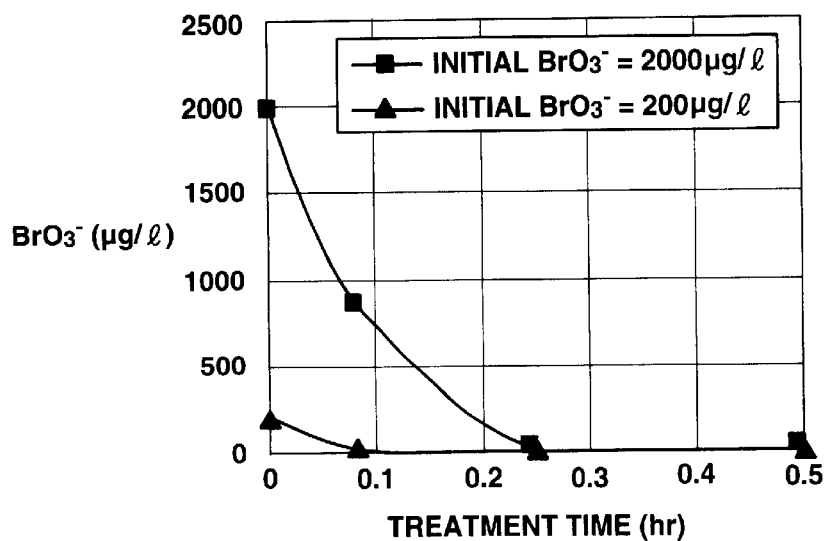
FIG. 4 is a graph showing the decomposition of bromate ions with the treatment time.

Using the above-mentioned apparatus of the first preferred embodiment of the invention, first and second liquids, respectively having initial bromate ion concentrations of 2,000 μg/l and 200 μg/l, were subjected to the bromate ion decomposition, as follows. At first, each liquid was adjusted to having a pH of about 5. Then, each liquid was introduced into the reaction vessel, and then a titanium oxide powder (isoelectric point: 6.4) as a photocatalyst was suspended in each liquid. Under this condition, the photocatalyst was irradiated with a light ray from the light source (i.e., a black light having a wavelength range of 300–410 nm and a peak of 366 nm). After predetermined times of the irradiation, the bromate concentration of each liquid was measured. The results are shown in FIG. 4. Hereinafter, parts of the following preferred embodiments that are the same as those of the previous preferred embodiments are denoted by the same numerals, and their explanations are not repeated.

Figure 5:
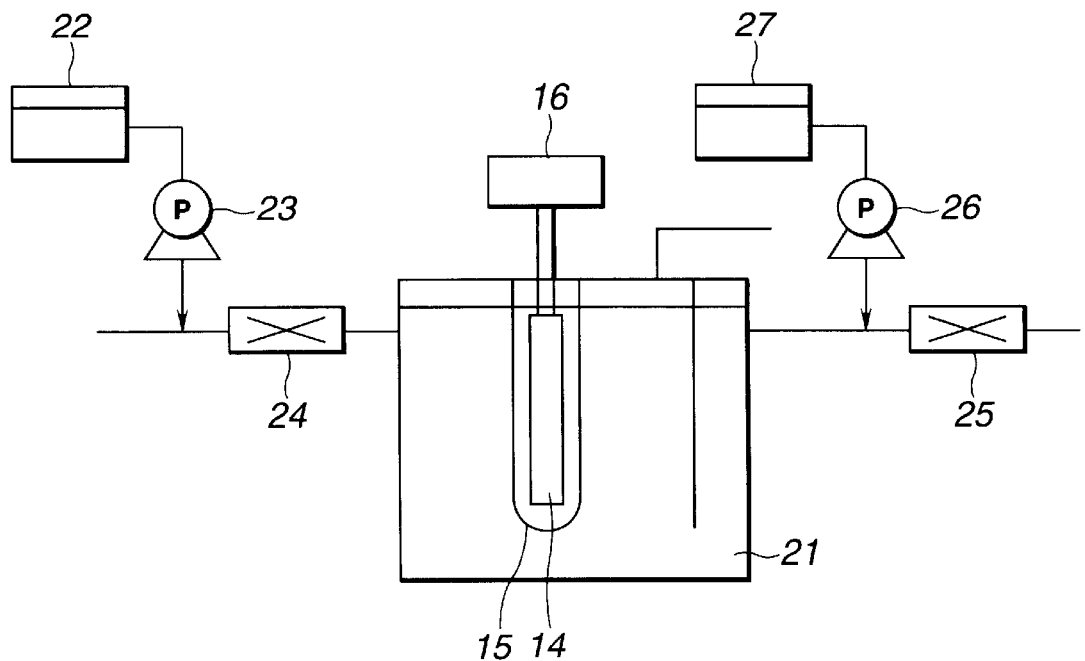
FIGS. 5–7 are schematic views respectively showing apparatuses according to second, third and fourth preferred embodiments of the invention.

FIG. 5 shows an apparatus according to a second preferred embodiment of the invention for continuously decomposing bromate ions contained in a liquid. At first, an acid (e.g., hydrochloric acid and sulfuric acid) solution may be added by a certain predetermined amount, depending on the type of the photocatalyst, from an acid solution vessel 22 by a pump 23 to the liquid, in order to adjust pH of the liquid to decompose bromate ions. It is, however, not necessary to add the acid solution to the liquid, if the liquid already has a pH at which bromate ions can be decomposed. The acid solution is mixed with the liquid by a mixer 24. Then, a photocatalyst, for example, having titanium oxide carried on a carrier may be introduced into the liquid. Then, the liquid may be introduced into a first section (photocatalytic reaction vessel) 21. Then, the decomposition of bromate ions may be repeated in the same manner as that of the first preferred embodiment. Then, an alkali (basic) solution may be added by a certain predetermined amount from an alkali solution vessel 27 by a pump 26 to the liquid in order to make pH of the liquid neutral, and the alkali solution and the liquid may be mixed together by a mixer 25. After that, the liquid may be released from the apparatus. It is, however, not necessary to add the alkali solution to the liquid, if pH of the liquid from the apparatus is not particularly regulated.

Figure 6:
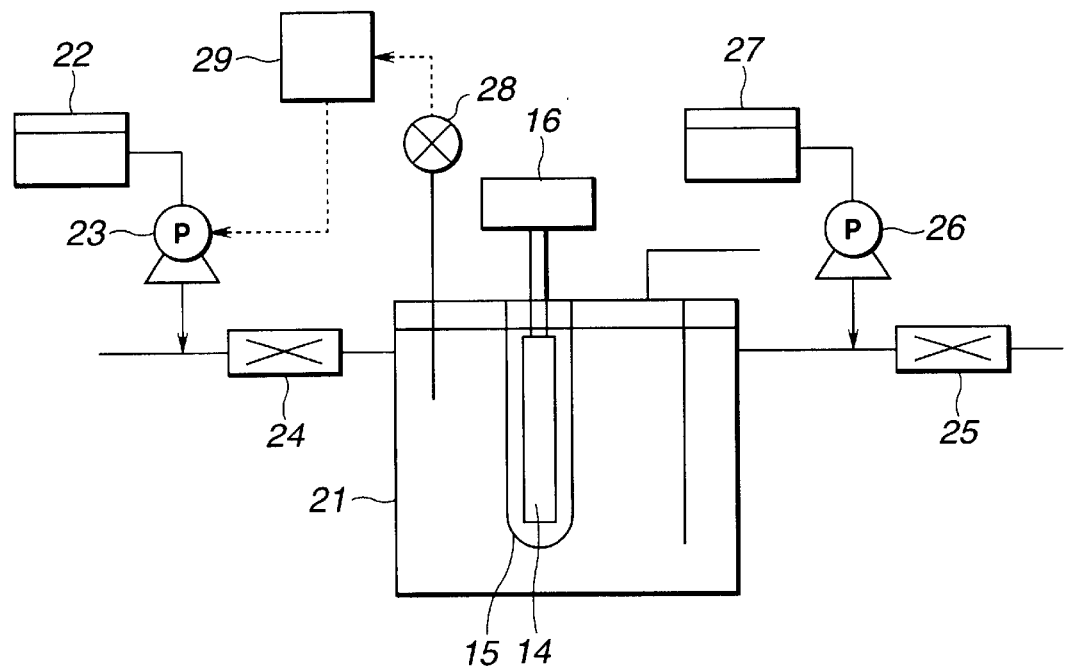

FIG. 6 shows an apparatus according to a third preferred embodiment of the invention for continuously decomposing bromate ions contained in a liquid. This apparatus has a combination of a pH meter 28 for measuring pH of the liquid and a controller 29 for controlling the driving speed of the pump 23, based on pH of the liquid measured by the pH meter 28. With this function of the controller 29, a certain predetermined amount of the acid solution may be added from the vessel 22 to the liquid such that pH of the liquid is made to be not higher than isoelectric point (e.g., 4) of the photocatalyst.

Figure 7:
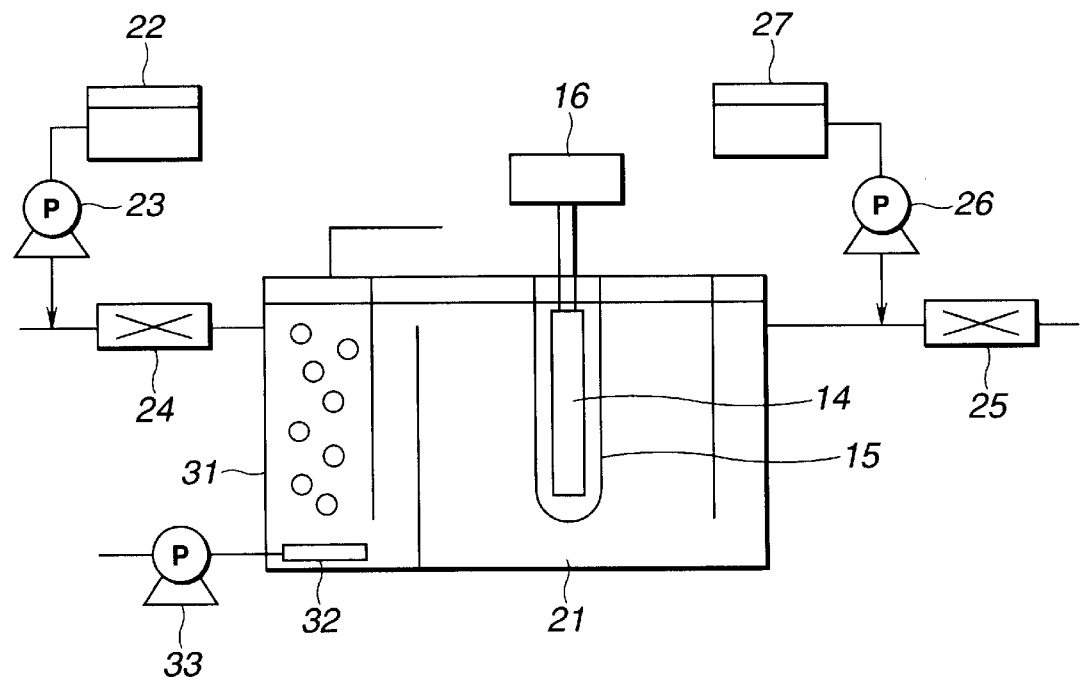

FIG. 7 shows an apparatus according to a fourth preferred embodiment of the invention for continuously decomposing bromate ions contained in a liquid. This apparatus has a second section (aeration vessel) 31 positioned upstream of the photocatalytic reaction vessel 21. The aeration vessel 31 is provided for removing dissolved oxygen from the liquid by aerating the liquid with a gas (e.g., nitrogen gas) that is free from oxygen. In the decomposition of the bromate ions, the liquid from the mixer 24, of which pH has been adjusted, is introduced into the aeration vessel 31. Then, the liquid is aerated in the aeration vessel 31 with nitrogen gas supplied from a diffuser 32 by a pump 33. This nitrogen gas after its use may be released into the air. The reason of aerating the liquid is as follows. When the liquid contains dissolved oxygen, this dissolved oxygen may serve as an acceptor of electron generated in the photocatalytic reaction. In fact, the dissolved oxygen may compete for electron with bromate ions, thereby lowering the decomposition rate of the bromate ions. Thus, it becomes possible to increase the decomposition rate of the bromate ions by removing dissolved oxygen from the liquid. After the removal of the dissolved oxygen, the liquid is subjected to the same treatments as those of the second preferred embodiment. Nitrogen gas used for the aeration may be replaced with argon gas or the like, as long as it does not contain oxygen.

Figure 8:
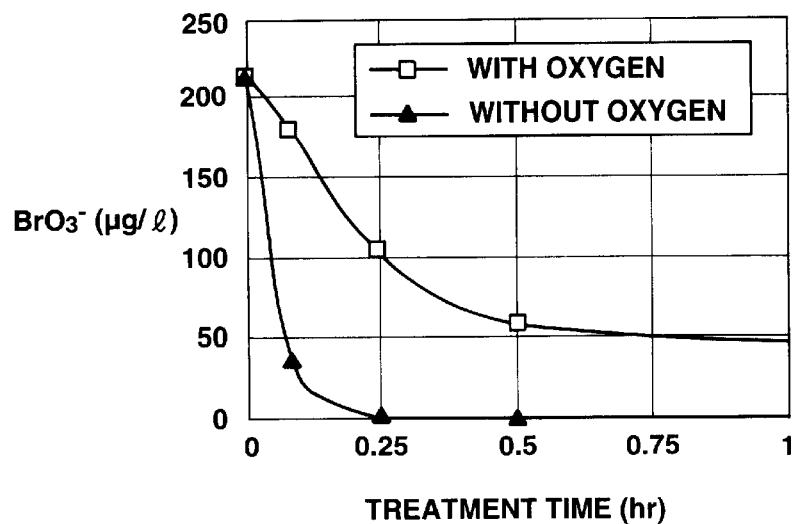
FIG. 8 is a graph showing the change of the decomposition of bromate ions by the elimination of dissolved oxygen.

Using the above-mentioned apparatus of the fourth preferred embodiment of the invention, a first liquid represented by triangular marks of FIG. 8 was aerated and then subjected to the bromate ion decomposition, and a second liquid represented by square marks of FIG. 8 was subjected to the bromate ion decomposition in the same manner as that for the first liquid, with the omission of the aeration. In other words, the first liquid did not contain dissolved oxygen by the aeration, but the second liquid contained it. After predetermined times of the light irradiation, the bromate concentration of each liquid was measured. The results are shown in FIG. 8, and it is understood therefrom that the bromate ion decomposition rate of the first liquid is much higher than that of the second liquid.

Figure 9:
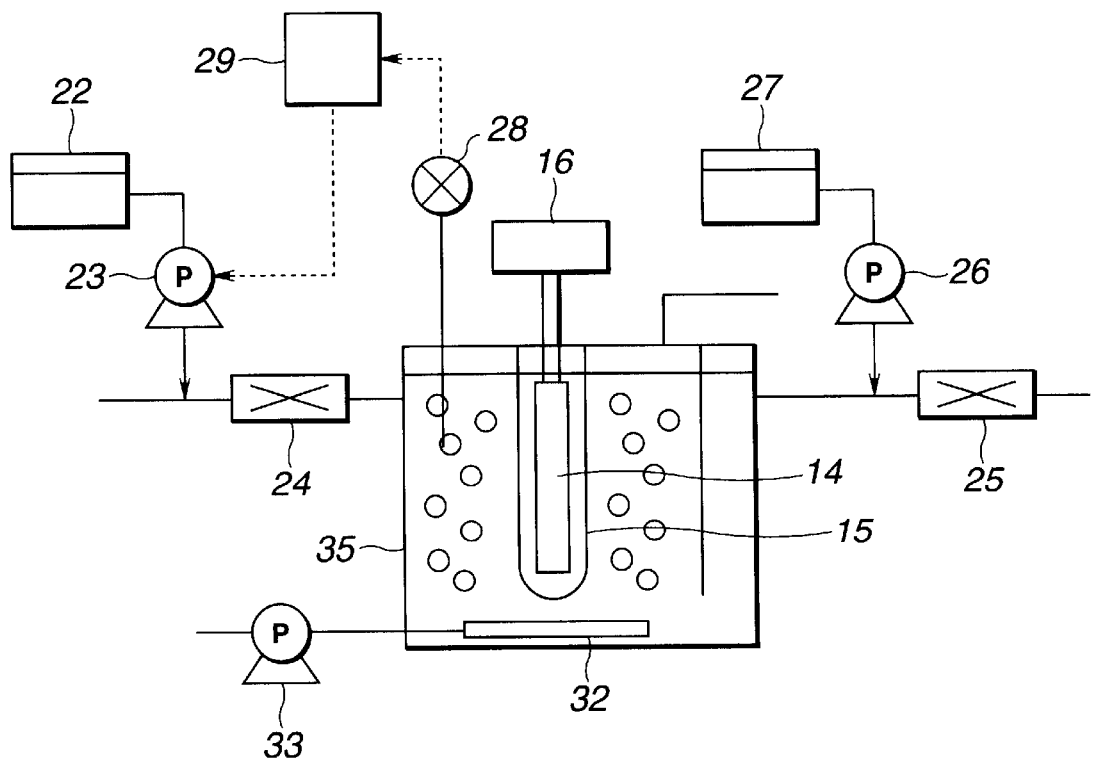
FIGS. 9–10 are schematic views respectively showing apparatuses according to fifth and sixth preferred embodiments of the inventions

FIG. 9 shows an apparatus according to a fifth preferred embodiment of the invention for continuously decomposing bromate ions contained in a liquid. This apparatus has a first section (vessel) 35 for generating therein a photocatalytic reaction to decompose the bromate ions. As shown in FIG. 9, the aeration of the liquid is conducted in the vessel 35 in a manner substantially the same as that of the fourth preferred embodiment.

Figure 10:
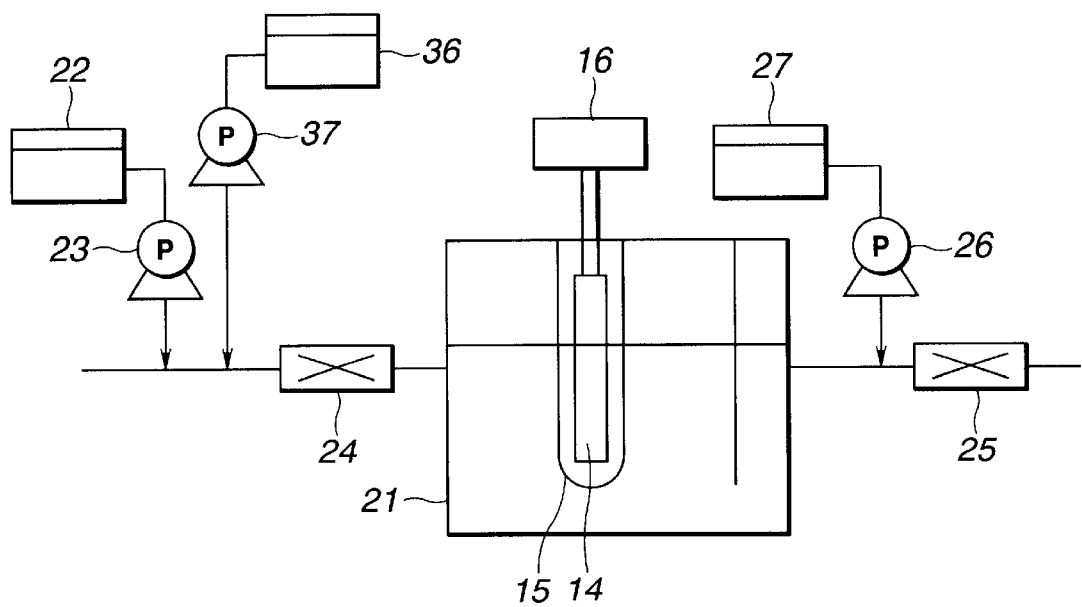

FIG. 10 shows an apparatus according to a sixth preferred embodiment of the invention for continuously decomposing bromate ions contained in a liquid. This apparatus is the same as that of the second preferred embodiment, except in that there is additionally provided a device for adding an agent to the liquid. This agent, such as 2-propanol, eliminates or reacts with holes that are produced together with electrons by the photocatalytic reaction. The device includes a vessel 36 for storing 2-propanol and a pump 37 for introducing 2-propanol from the vessel 36 into the liquid, before the liquid is introduced into the vessel 21. In fact, 2-propanol, together with the acid solution from the vessel 22, is mixed with the liquid by the mixer 24, and then the resultant mixture is introduced into the vessel 21. As stated above, both of electrons and holes are generated by the photocatalytic reaction. If the agent does not exist in the liquid, these holes ($h^+$) react with water molecules to generate oxygen, as shown by the following reaction formula (6).

$$2H_2O+4h^+ \rightarrow O_2+4H^+ \tag{6}$$

If, for example, 2-propanol as the agent exists in the liquid, the above-mentioned reaction (4) will occur, in stead of the reaction (6). In fact, the rate of the reaction (4) is higher than that of the reaction (6). Therefore, it becomes possible to accelerate the photocatalytic reaction by adding 2-propanol. It should be noted that 2-propanol may be replaced with another organic matter that is capable of eliminating or reacting with holes.

Figure 11:
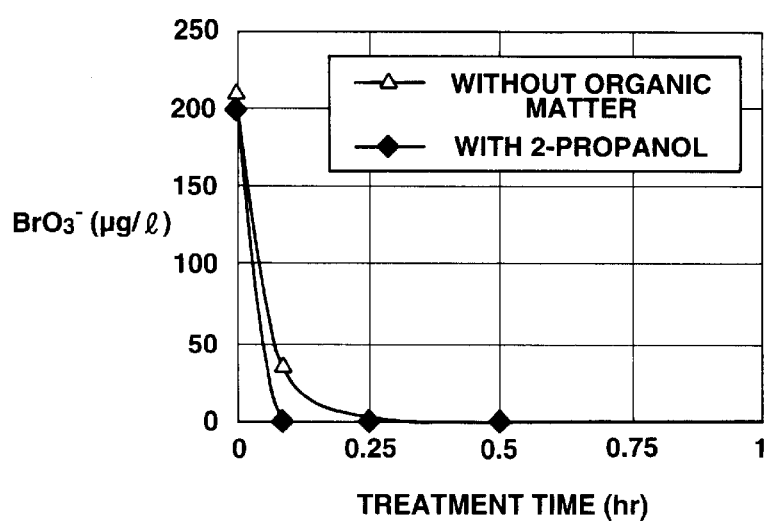
FIG. 11 is a graph showing the change of the decomposition of bromate ions by the addition of 2-propanol (hole scavenger)

FIG. 11 shows the change of bromate ion concentration of a first liquid represented by triangular marks, to which any organic matter as the agent was not added, and that of a second liquid represented by diamond marks, to which 2-propanol was added. It is understood from FIG. 11 that the bromate ion decomposition rate was increased by adding 2-propanol to the liquid.

According to a seventh preferred embodiment of the invention, pH of the liquid is particularly adjusted, before the photocatalytic reaction, to not higher than 4, regardless of the type of the photocatalyst, for example, by using an apparatus according to the fifth preferred embodiment of the invention shown in FIG. 9. With this pH adjustment, the bromate ions are reduced to bromine, as shown by the following reaction formula.

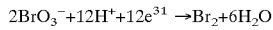
$$2BrO_3^- + 12H^+ + 12e^{31} \rightarrow Br_2 + 6H_2O$$

The resultant bromine is released into the air by aerating the liquid. In other words, bromide ions (Br⁻) do not remain in the liquid by the above pH adjustment. In contrast, if bromine ions remain in the liquid, they may be turned into a carcinogenic trihalomethane, such as bromoform ($CHBr_3$), by the existence of an unsaturated organic matter or the like in the liquid.

Figure 12:
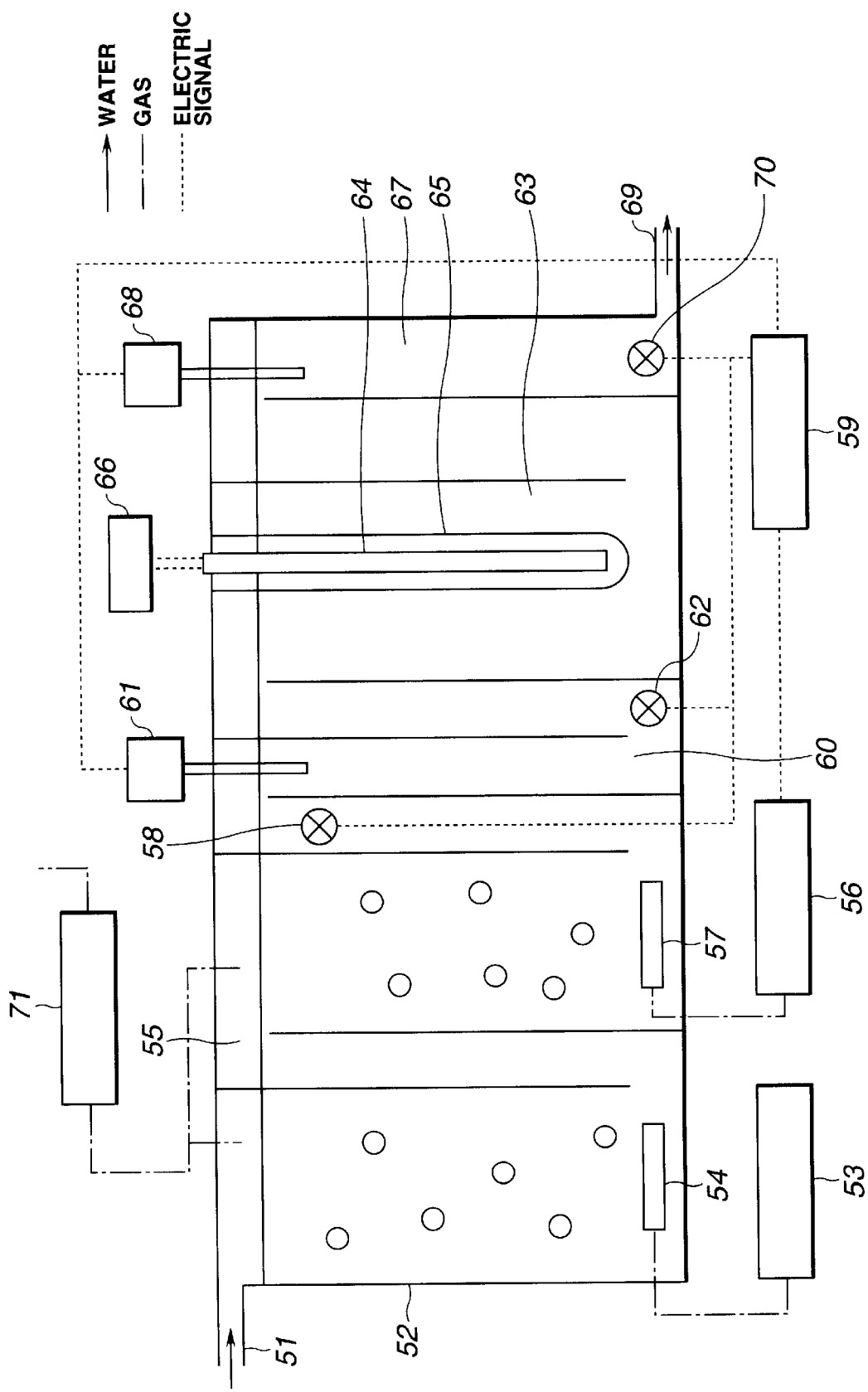
FIGS. 12–15 are schematic views respectively showing apparatuses according to eighth to eleventh preferred embodiments of the invention.

FIG. 12 shows an apparatus according to an eighth preferred embodiment of the invention for continuously purifying a liquid containing bromide ions and/or bromate ions. This apparatus has an inlet 51 and a first section (ozonization vessel) 52 for treating the liquid with ozone. This ozone is generated by an ozone generator 53 and then introduced into the ozonization vessel 52 through a diffuser 54. The apparatus further has a second section (deozonization vessel) 55 for removing the ozone from the liquid. The deozonization vessel 55 is downstream of the ozonization vessel 52 such that the liquid is allowed to flow from the ozonization vessel 52 to the deozonization vessel 55. The apparatus further has a third section (photocatalytic reaction vessel) 63 for generating therein a photocatalytic reaction. This vessel 63 is positioned downstream of the deozonization vessel 55 such that the liquid is allowed to flow from the deozonization vessel 55 to the photocatalytic reaction vessel 63. The vessel 63 has a UV lamp 64 for irradiating a photocatalyst with a UV ray having an energy that is not lower than that of a band gap of the photocatalyst such that the photocatalytic reaction is generated in the vessel 63. In other words, the UV ray has a wavelength that is not longer than the threshold wavelength shown in Table 3. The UV lamp 64 is protected by a tube 65 and is electrically connected to a power source 66 that controls the intensity of the UV ray.

The liquid is purified by using the apparatus shown in FIG. 12, as follows. At first, the liquid is allowed to flow into the ozonization vessel 52 through the inlet 51. Then, the liquid is treated with ozone by bubbling ozone into the vessel 52 from the diffuser 54, to remove organic matters of the liquid and to sterilize the liquid. If the liquid contains bromide ions, the bromide ions may turn into bromate ions by the ozonization. The thus produced bromate ions can be decomposed by the photocatalytic reaction in the vessel 63, as mentioned hereinafter. After the ozonization, the liquid is allowed to flow into the deozonization vessel 55. Then, the liquid is subjected to deozonization by bubbling a gas, which is supplied from a gas supply source 56 (e.g., a blower or cylinder), from a diffuser 57 into the vessel 55. As shown in FIG. 12, a dissolved ozone ($DO_3$) sensor 58 is disposed downstream of the vessel 55. This sensor 58 monitors the ozone concentration of the liquid to check whether or not the deozonization was sufficiently conducted in the vessel 55. Based on the ozone concentration monitored by the sensor 58, a controller 59 controls the flow rate of the gas from the gas supply source 56 to sufficiently conduct the deozonization in the vessel 55. After passing the dissolved ozone sensor 58, the liquid is allowed to flow into a first pH adjustment section 60. In this section 60, pH of the liquid is made to be not higher than isoelectric point of the photocatalyst by adding an acid solution to the liquid from a first pH adjustment pump 61. A first pH sensor 62 is disposed immediately downstream of the section 60 to monitor pH of the liquid. Based on this monitored pH of the liquid, the controller 59 controls the amount of the acid solution from the pump 61 to properly adjust pH of the liquid. After passing the pH sensor 62, the liquid is allowed to flow into the photocatalytic reaction vessel 63. The photocatalyst of the vessel 63 may be formed into a coating (film) formed on the inner surface of the vessel 63. Alternatively, the photocatalyst may be in the form of powder and may comprise a carrier carrying thereon titanium oxide powder or the like. This photocatalyst is irradiated with the UV light from the UV lamp 64 to generate the photocatalytic reaction in the vessel 63. With this, it is possible to decompose bromate ions contained in the liquid. After passing the photocatalytic reaction vessel 63, the liquid is allowed to flow into a second pH adjustment section 67. In this section 67, pH of the liquid is made to be in a neutral range by adding a basic solution to the liquid from a second pH adjustment pump 68. Immediately upstream of an outlet 69 of the apparatus, a second pH sensor 70 is disposed to monitor pH of the liquid. Based on this monitored pH of the liquid, the controller 59 controls the amount of the basic solution from the pump 68 to properly adjust pH of the liquid. After the pH adjustment in the section 67, the liquid is released from the apparatus. Ozone released from the ozonization and deozonization vessels 52 and 55 is completely collected in a tower 71. Then, the collected ozone is made to be harmless in the tower 71, followed by exhaust into the air. In conclusion, it is possible by the apparatus according to the eighth preferred embodiment of the invention to decompose organic matters of the liquid, sufficiently sterilize the liquid, and completely decompose bromate ions of the liquid including bromate ions generated by the ozonization.

Figure 13:
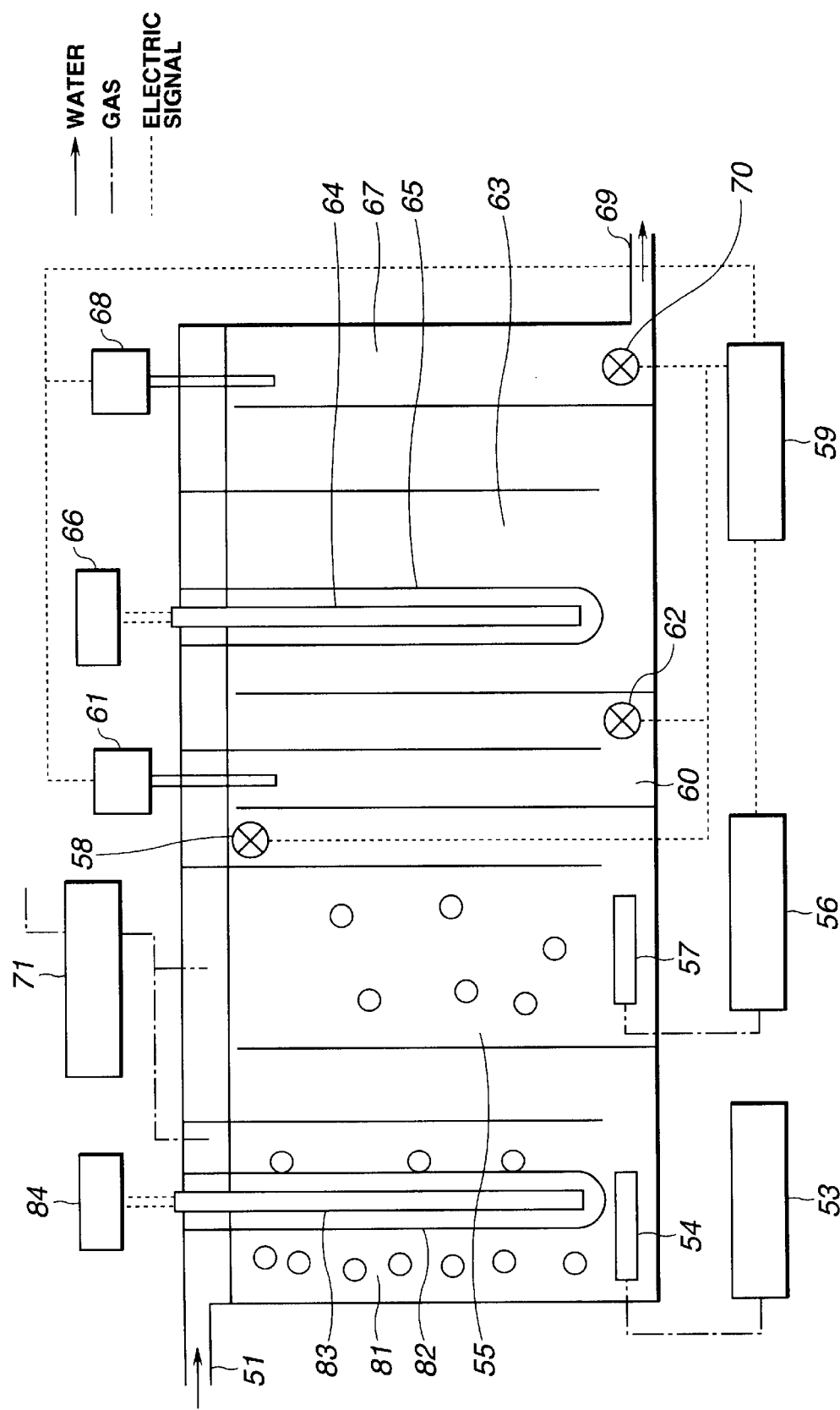

FIG. 13 shows an apparatus according to a ninth preferred embodiment of the invention for continuously purifying a liquid containing bromide ions and/or bromate ions. This apparatus is similar to that of the eighth preferred embodiment. Therefore, parts and construction which are the same as those of the eighth preferred embodiment are denoted by the same numerals, and their explanations are not repeated here. The apparatus has a first section (accelerated oxidation vessel) 81 for subjecting the liquid to an accelerated oxidation by an oxidizer to remove organic matters of the liquid and to sterilize the liquid. This vessel 81 has a UV lamp 83 that emits a UV light having a dominant wavelength of about 254 nm. This UV lamp 83 is covered with a tube 82 and electrically connected with a power source 84. In the operation of the apparatus, the liquid is introduced into the vessel 81 from an inlet 51. Then, ozone, which is supplied from an ozone generator 53, is bubbled into the vessel 81 from a diffuser 54. Under this condition, the ozone is irradiated with the UV light. With this, ozone is decomposed into hydroxyl radical having an oxidative power greater than that of ozone. This hydroxyl radical rapidly reacts with organic matters of the liquid in the vessel 81, thereby sufficiently removing the organic matters and sterilizing the liquid. Upon this, if the liquid contains bromide ions, the bromide ions may turn into bromate ions. These bromate ions are decomposed in a photocatalytic reaction vessel 63 in the same manner as that of the eighth preferred embodiment. After passing the vessel 81, the same treatments as those of the eighth preferred embodiment are conducted. In conclusion, it is possible by the apparatus of the ninth embodiment to decompose organic mattes of the liquid that are slightly decomposable, sufficiently sterilize the liquid, and completely decompose bromate ions including those generated by the accelerated oxidation. It should be noted that the above-mentioned ultraviolet ray for treating therewith ozone may be replaced with hydrogen peroxide. Furthermore, a photocatalyst also may be used in the accelerated oxidation.

Figure 14:
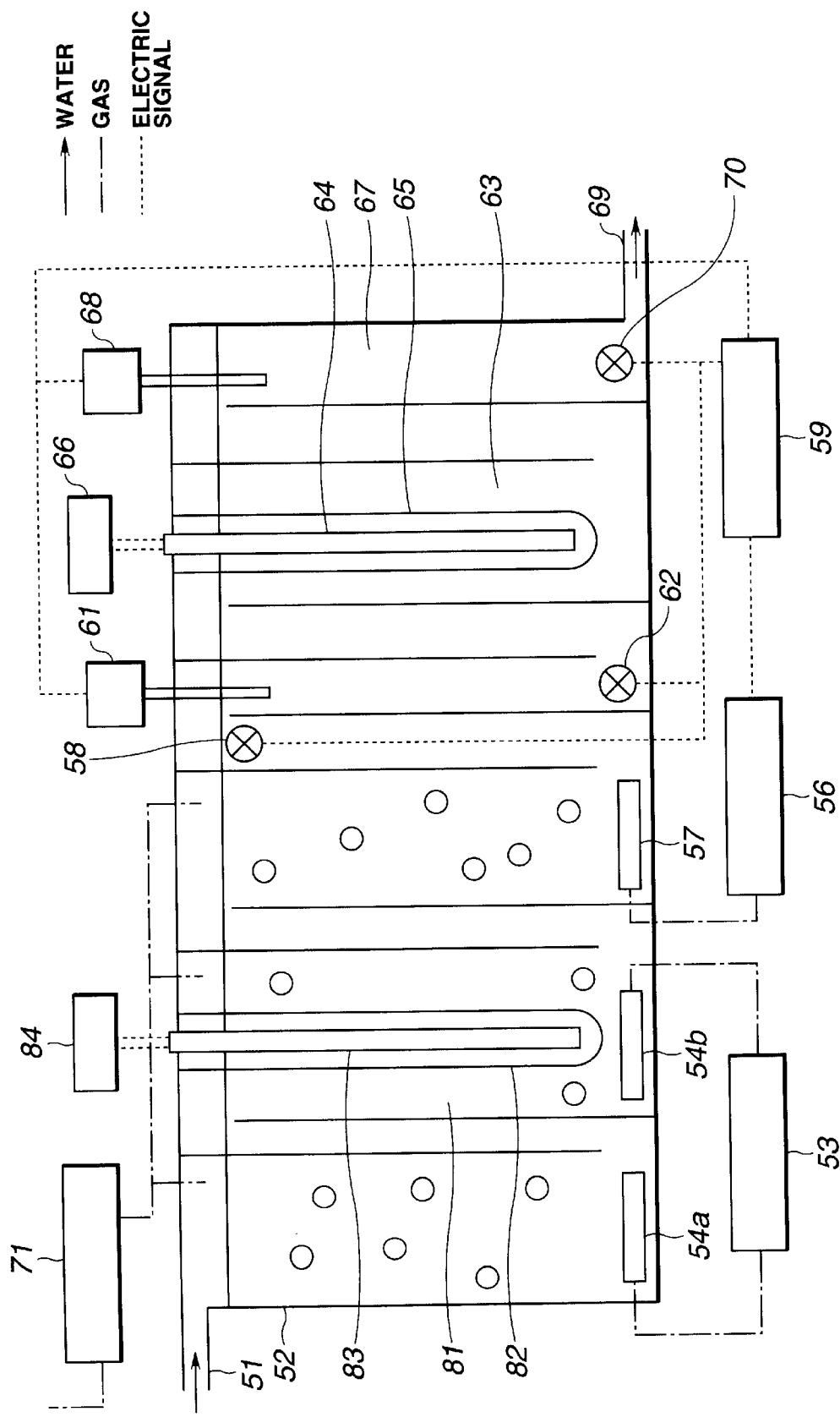

FIG. 14 shows an apparatus according to a tenth preferred embodiment of the invention for continuously purifying a liquid containing bromide ions and/or bromate ions. This apparatus is similar to those of the eighth and ninth preferred embodiments. Therefore, parts and construction which are the same as those of the eighth and ninth preferred embodiments are denoted by the same numerals, and their explanations are not repeated here. The apparatus shown in FIG. 14 has a first section (ozonization vessel) 52, a second section (accelerated oxidation vessel) 81, and a third section (photocatalytic reaction vessel) 63. In the operation of the apparatus, the liquid is introduced into the ozonization vessel 52 from an inlet 51. Then, ozone gas, which is supplied from an ozone generator 53, is bubbled into the ozonization vessel 52 from a diffuser 54a. With this, it becomes possible to sterilize the liquid and to decompose organic matters into smaller molecules than molecules of these organic matters. After the ozonization vessel 52, the liquid is introduced into the accelerated oxidation vessel 81. In this vessel 81, ozone gas, which is supplied from the ozone generator 53, is bubbled into the vessel 81 from a diffuser 54b. Under this condition, the ozone is irradiated with a UV light 83. With this, ozone is decomposed into hydroxyl radical having an oxidative power greater than that of ozone. This hydroxyl radical rapidly reacts in the vessel 81 with slightly decomposable organic matters of the liquid, which have not been decomposed by the ozonization in the vessel 52, thereby sufficiently removing the slightly decomposable organic matters and sterilizing the liquid. After passing the vessel 81, the same treatments as those of the eighth preferred embodiment are conducted. In conclusion, it is possible by the apparatus of the tenth preferred embodiment to efficiently decompose slightly decomposable organic matters of the liquid, sufficiently sterilize the liquid, and completely decompose bromate ions including those generated by the ozonization and the accelerated oxidation.

Figure 15:
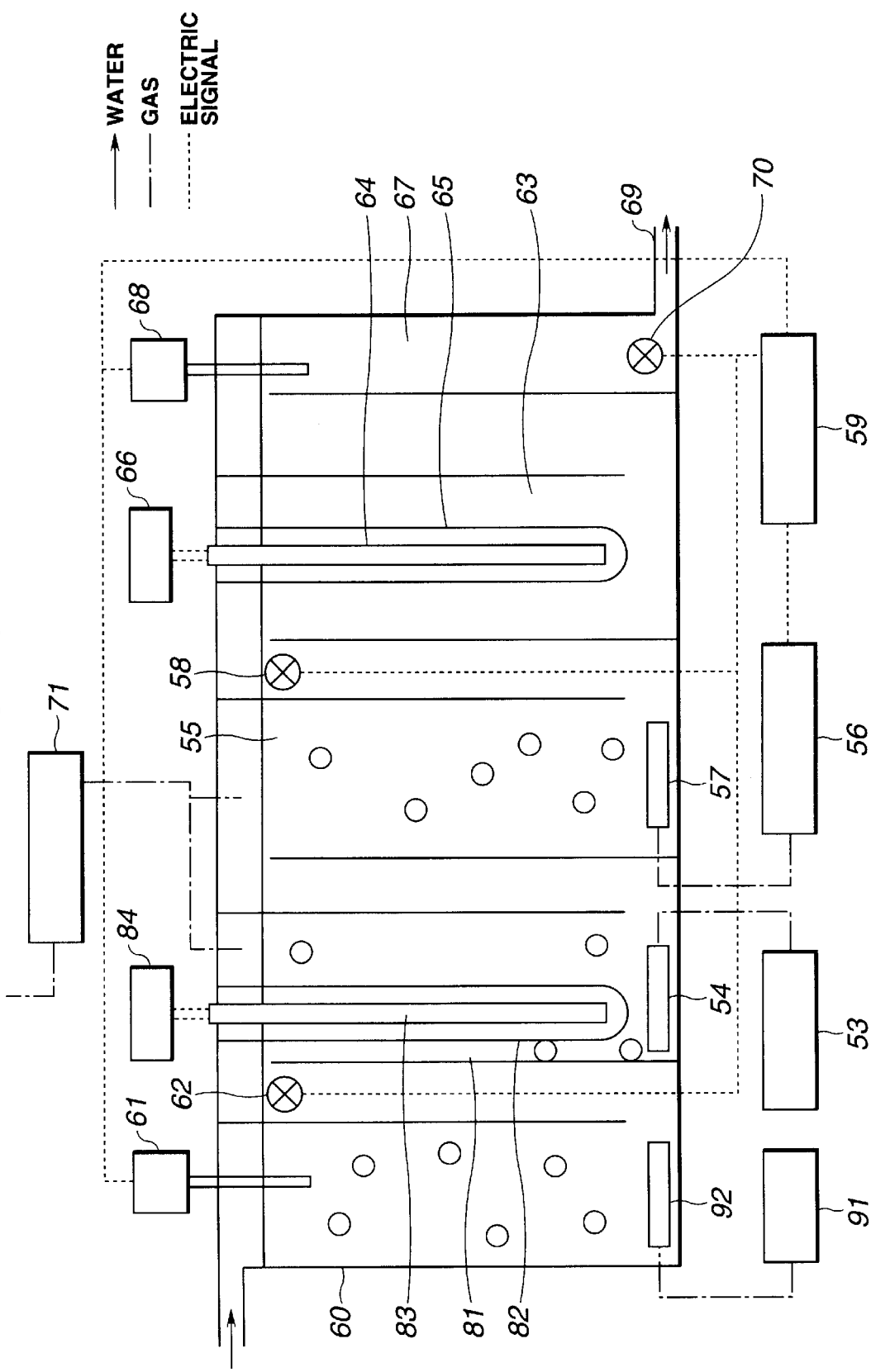
Figure 16:
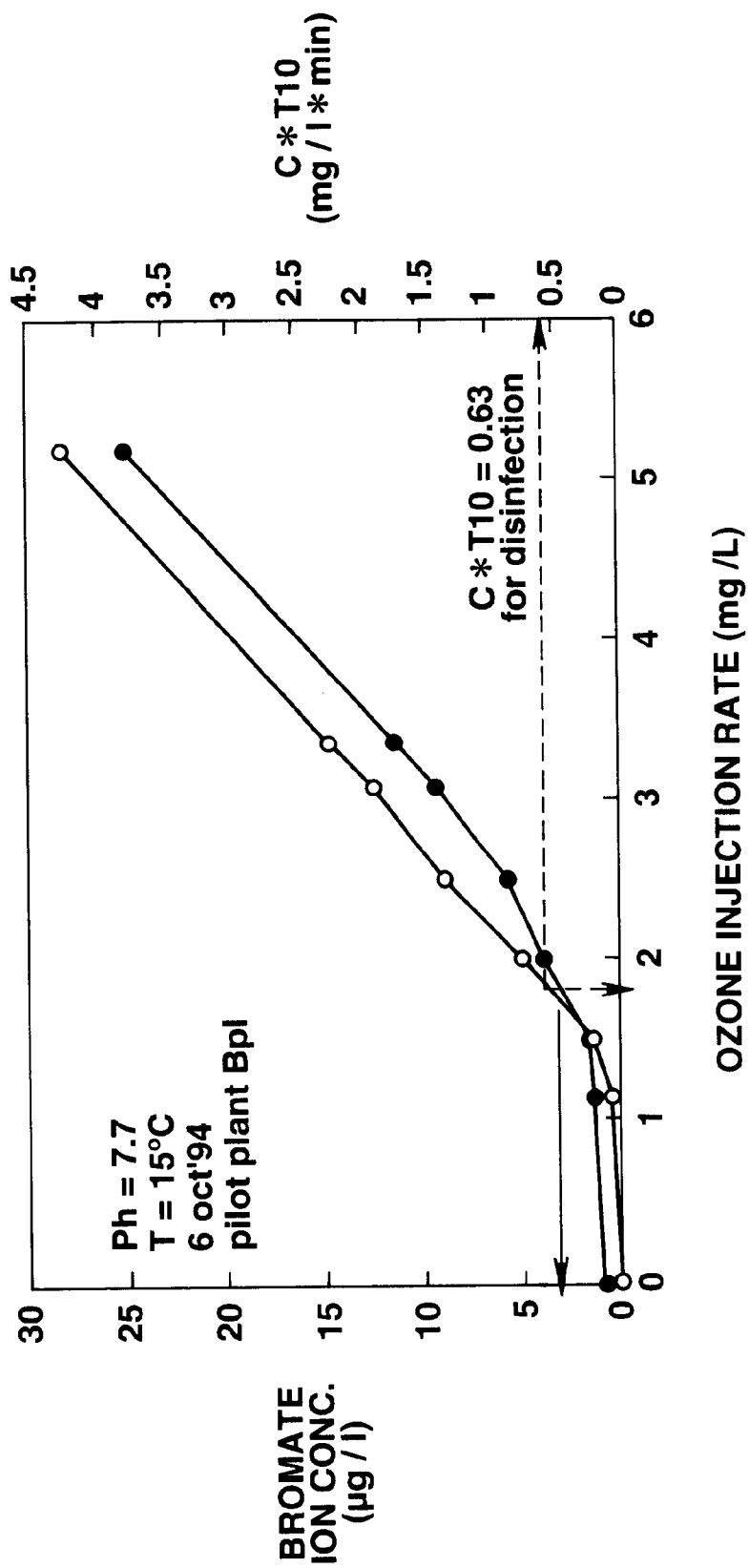
FIG. 16 is a graph showing the changes of bromic ion concentration and C*T10 with the ozone injection rate for destroying Giardia.

FIG. 15 shows an apparatus according to an eleventh preferred embodiment of the invention for continuously purifying a liquid containing bromide ions and/or bromate ions. This apparatus is similar to those of the ninth preferred embodiment. Therefore, parts and construction which are the same as those of the ninth preferred embodiment are denoted by the same numerals, and their explanations are not repeated here. The apparatus shown in FIG. 15 has a first section (first pH adjustment vessel) 60 for removing carbonic acid from the liquid, a second section (accelerated oxidation vessel) 81, and a third section (photocatalytic reaction vessel) 63. When the liquid contains carbonic acid, it may be required to use a large amount of the pH adjusting reagent in eighth to tenth preferred embodiments due to the pH buffer action of carbonic acid. Furthermore, when the liquid contains carbonic acid in the accelerated oxidation vessel 81, some of the hydroxyl radicals may react with a radical scavenger (i.e., carbonic acid and the like) due to that hydroxyl radical is not selective in choosing reactant. In other words, some of the hydroxyl radicals may be consumed in its reaction with carbonic acid. Therefore, the existence of carbonic acid may lower the efficiency of the accelerated oxidation in the vessel 81. In view of this, carbonic acid is removed from the liquid in the vessel 60.

In the operation of the apparatus shown in FIG. 15, the liquid is introduced into the first pH adjustment vessel 60 from an inlet. Then, a reagent is added from a first pH adjustment pump 61 to the liquid in the vessel 60, thereby adjusting the liquid to having a pH necessary for removing carbonic acid. Under this condition, nitrogen gas, which is supplied from a cylinder 91, is bubbled into the liquid from a diffuser 92 to remove carbonic acid dissolved in the liquid. A first pH sensor 62 is disposed downstream of the vessel 60 to monitor pH of the liquid. Based on the monitored pH of the liquid in the form of electric signal, a controller 59 controls the amount of the reagent from the pump 61 to properly adjust pH of the liquid. After passing the pH sensor 62, the liquid is subjected in the same manners as those of the ninth preferred embodiment to an accelerated oxidation in the vessel 81, then a deionization in the vessel 55, then a photocatalytic reaction in the vessel 63, and then to a second pH adjustment in a second pH adjustment section 67. If conditions of the accelerated oxidation vessel 81 are adequate, ozone may not remain in the liquid by the accelerated oxidation. In this case, it is optional to omit the deionization. In conclusion, it is possible by the apparatus of the eleventh preferred embodiment to efficiently decompose slightly decomposable organic matters of the liquid, sufficiently sterilize the liquid, and completely decompose bromate ions including those generated by the accelerated oxidation. According to the invention, it is possible to decompose bromate ions with a lower cost, as compared with a conventional method using activated carbon or ion exchange. In fact, it becomes sometimes necessary to replace activated carbon with a new one, due to its deterioration. In contrast, such replacement is not necessary in the invention. Thus, the maintenance becomes easier in the invention. Furthermore, it is possible to combine a conventional ozonization or accelerated oxidation system with a method or apparatus of the invention.

Figure 19:
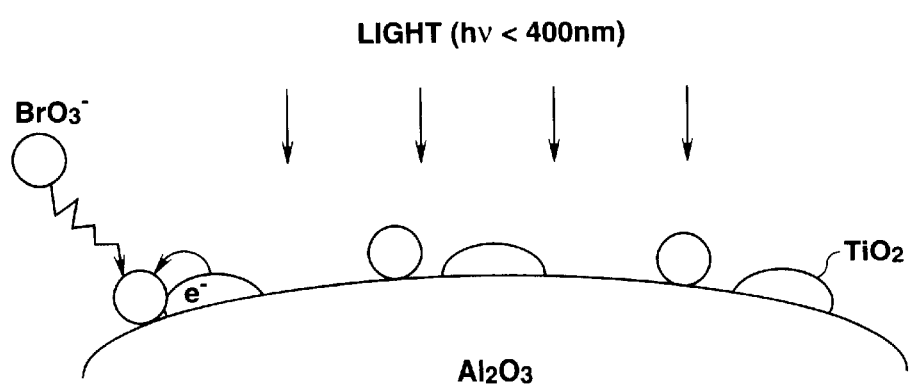
FIG. 19 is a schematic view showing a photocatalyst according to a preferred embodiment of the invention, which is a combination of $TiO_2$ and $Al_2O_3$.

There is provided a second photocatalyst according to a preferred embodiment of the invention. The second photocatalyst may be a double oxide containing in the molecule titanium and a metal atom having an electronegativity lower than that of titanium. Examples of the double oxide are $SrTiO_3$ and $BaTiO_3$. Alternatively, the second photocatalyst may be a combination of titanium oxide and an oxide of the metal atom, such as aluminum oxide. In this case, titanium oxide may be carried on the latter oxide, as shown in FIG. 19.

It becomes possible to omit the pH adjustment of the liquid before the photocatalytic reaction by using the second photocatalyst, as will be explained in detail hereinafter.

Titanium oxide is generally used as a conventional photocatalyst because the oxidation-reduction potential of titanium oxide is suitable for the oxidative decomposition of harmful substances and because titanium ion does not easily dissociate from titanium oxide. In contrast, if, for example, zinc oxide is used as a photocatalyst, zinc ion may dissociate therefrom to cause a so-called secondary hazard or contamination by zinc. Furthermore, zinc oxide and the like may become inferior, if continuously used.

Although the isoelectric point of titanium oxide slightly varies depending on the type of titanium oxide crystal and on the method for producing titanium oxide, the isoelectric point titanium oxide is about 5 to about 6, as shown in Table 2. Thus, as stated above, it is preferable to adjust a liquid to having a pH not higher than 6 for decomposing bromate ions. In general, drinking water or treated sewage water (final effluent is regulated to have a pH of at least 5.8. Therefore, it is necessary to adjust the liquid to having a pH of, for example, about 5 for the decomposition of bromate ions and then adjust the liquid to having a pH of at least 5.8 for its release. Alternatively, it is necessary to adjust the liquid to having a pH of 5.8–6.0 for both of the decomposition of bromate ions and subsequent release of the liquid.

It may be difficult to adjust the liquid to having a narrow pH range of 5.8–6.0. Furthermore, this tends to reduce the rate of the bromate ion decomposition, since this pH range is very close to the isoelectric point of titanium oxide. The second photocatalyst of the invention has an isoelectric point of at least about 7 and thus makes the above mentioned pH adjustment unnecessary. With this, it becomes possible to simplify the structure of the apparatus for decomposing bromate ions.

In general, the higher electronegativity of an atom is, the higher acidity of an oxide of the atom is. Provided that first and second atoms are the same in electronegativity and that the first atom has a higher valence than that of the second atom, an oxide of the first atom is higher in acidity than that of the second atom. The higher acidity of an oxide is, the lower isoelectric point of the oxide is. In addition, acidity may be influenced by crystal structure and the like. Table 4 shows electronegativity values of various elements.

TABLE 4

| Electronegativity (of Pauling) | Elements |
| --- | --- |
| 4.0 | F |
| 3.5 | O |
| 3.0 | N and Cl |
| 2.8 | Br |
| 2.5 | C, S and I |
| 2.4 | Au and Se |
| 2.2 | Ru, Os, Rh, Ir, Pd and Pt |
| 2.1 | H, P and Te |
| 2.0 | B and As |
| 1.9 | Cu, Ag, Hg, Sb, Bi, Tc, and Re |
| 1.8 | Si, Ge, Sn, Pb, Mo, Tl, Fe, Co and Ni |
| 1.7 | Cd, In, W and U |
| 1.6 | Zn, Ga, V, Nb and Cr |
| 1.5 | Be, Al, Ti, Ta and Mn |
| 1.4 | Zr |
| 1.3 | Sc, Hf and Th |
| 1.2 | Mg and Y |
| 1.1 | La and Ac |
| 1.0 | Li, Ca and Sr |
| 0.9 | Na, Ba and Ra |
| 0.8 | K and Rb |
| 0.7 | Cs and Fr |

For example, Zn is higher than Mg in electronegativity, as shown in Table 4, and ZnO is lower than MgO in isoelectric point, as shown in Table 2.

Suppose a double oxide contains in the molecule titanium and a metal atom having an electronegativity lower than that of titanium. This double oxide (e.g., $SrTiO_3$ and $BaTiO_3$) becomes higher than titanium oxide in isoelectric point, as shown in Table 2. With reference to FIG. 2 and Table 2, it is understood that, for example, if a liquid has a pH of less than 8.6, $SrTiO_3$ (photocatalyst), which is in contact with this liquid, becomes positively charged. With this, $SrTiO_3$ adsorbs bromate ions, and under this condition the bromate ions can be decomposed by the photocatalytic reaction. Similarly, if a liquid has a pH of less than 9.9, $BaTiO_3$ becomes positively charged, thereby allowing the decomposition of bromate ions. Therefore, if, for example, $SrTiO_3$ or $BaTiO_3$ is used as a photocatalyst, it becomes possible to conduct the decomposition of bromate ions at a pH of about 7 within neutral range. Therefore, it becomes unnecessary to decrease pH of the liquid before the photocatalytic reaction and to increase pH of the liquid after that. As shown in FIG. 1, all of $TiO_2$, $SrTiO_3$ and $BaTiO_3$ have a band gap of 3.2 eV. Therefore, all of these can be irradiated with the same UV light ray having a wavelength of not longer than about 400 nm in order to generate a photocatalytic reaction. As shown in FIG. 1, the potentials of the excited electrons of $TiO_2$, $SrTiO_3$ and $BaTiO_3$ are each lower than the oxidation-reduction potential of bromate ion ($BrO_3^-/Br^-$). Therefore, it becomes possible to reduce bromate ions, as shown by the reaction formula (1). It should be noted that the second photocatalyst can be used in each of the above-mentioned apparatuses according to the first to eleventh embodiments of the invention. In this case, it becomes possible to omit the pH adjustment devices before and after the photocatalytic reaction.

Figure 17:
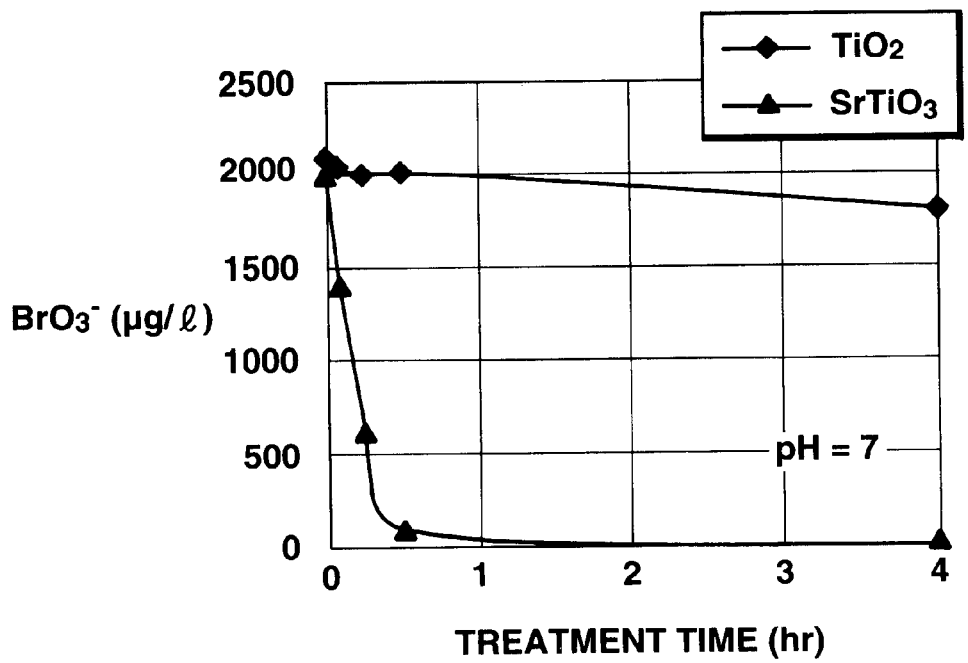
FIG. 17 is a graph showing the decomposition of bromate ions by using $TiO_2$ and $SrTiO_3$.

Using the above-mentioned apparatus of the first preferred embodiment of the invention shown in FIG. 3, a liquid having an initial bromate ion concentration of 2,000 ppb and a pH of 7 was subjected to the bromate ion decomposition, as follows. At first, the liquid was introduced into the reaction vessel, and then a $TiO_2$ as a photocatalyst was suspended in the liquid. Under this condition, this photocatalyst was irradiated with a light ray from the light source. After predetermined times of the irradiation (treatment), the bromate concentration of the liquid was measured. This bromate ion decomposition was repeated by replacing $TiO_2$ with $SrTiO_3$. The results are shown in FIG. 17.

Figure 18:
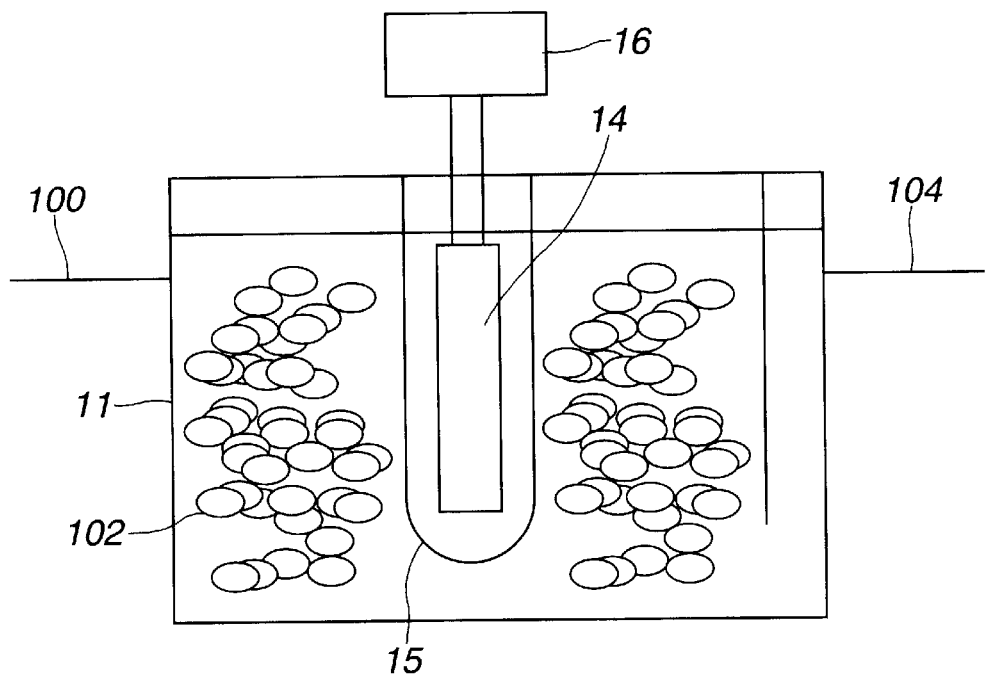
FIG. 18 is a schematic view showing an apparatus according to a twelfth preferred embodiment of the invention.

FIG. 18 shows an apparatus according to a twelfth preferred embodiment of the invention for continuously decomposing bromate ions. Parts that are the same as those of the apparatus according to the first preferred embodiment are denoted by the same numerals, and their explanations are not repeated here. In the decomposition of the bromate ions, a liquid containing bromate ions is introduced from an inlet 100 into a reaction vessel 11 for continuously decomposing bromate ions, which is charged with a double oxide 102 as a photocatalyst. As mentioned above, this double oxide 102 contains in the molecule titanium and a metal atom having an electronegativity lower than that of titanium such that the double oxide has an isoelectric point of at least about 7. After the introduction of the liquid, the double oxide is irradiated with a light ray (wavelength: not longer than 400 nm) from a light source 14 for generating a photocatalytic reaction to decompose bromate ions. The thus treated liquid is discharged from an outlet 104. In this decomposition, the double oxide may be replaced with an alternative photocatalyst that is a combination of titanium oxide and a metal oxide (e.g., alumina) carrying thereon this titanium oxide, as shown in FIG. 19. This metal oxide has an isoelectric point of at least about 7. Similar to the double oxide, this alternative photocatalyst is capable of adsorbing bromate ions to decompose these ions, at a pH of at least about 7. For example, alumina itself does not have the photocatalytic activity. However, as shown in FIG. 19, alumina is capable of adsorbing bromate ions ($BrO_3^-$), and the adsorbed bromate ions can be reduced into bromide ions ($Br^-$) by electrons generated by irradiating. $TiO_2$ adjacent to the adsorbed bromate ions, with the light ray having a wavelength of not longer than 400 nm.

The entire disclosure of Japanese Patent Application Nos. 10-253152 and 10-253153, each filed on Sep. 8, 1998, including specification, claims, drawings and summary, of which priorities are claimed in the present application, is incorporated herein by reference in its entirety.

What is claimed is:

1. A method for decomposing bromate ions contained in a liquid, said method comprising:

bringing said liquid into contact with a photocatalyst, said photocatalyst comprising at least one metal oxide including titanium and a metal having an electronegativity lower than that of titanium such that said photocatalyst has an isoelecric point greater than or equal to the pH of said liquid; and irradiating said photocatalyst with a light ray having an energy that is not lower than that of a band gap of said photocatalyst, thereby generating a photocatalytic reaction to decompose said bromate ions.

2. A method according to claim 1, wherein said at least one metal oxide is a double oxide containing in the molecule titanium and said metal.

3. A method according to claim 2, wherein said double oxide is at least one of $SrTiO_3$ or $BaTiO_3$.

4. A method according to claim 1, wherein said at least one metal oxide is a combination of titanium oxide and an oxide of said metal.

5. A method according to claim 4, wherein said oxide of said metal carries thereon said titanium oxide.

6. A method according to claim 1, wherein said irradiating is conducted under a condition that said liquid has a pH of at least about 7.

7. An apparatus for decomposing bromate ions contained in a liquid, said apparatus comprising:

a first section having a bromate ion containing liquid therein for generating therein a photocatalytic reaction to decompose said bromate ions;

a photocatalyst adapted to be brought into contact with said liquid in said first section, said photocatalyst comprising at least one metal oxide including titanium and a metal having an electronegativity lower than that of titanium such that said photocatalyst has an isoelectric point greater than or equal to the pH of said liquid; and a light source for irradiating said photocatalyst with a light ray having an energy that is not lower than that of a band gap of said photocatalyst such that said photocatalytic reaction is generated in said first section when said photocatalyst is in contact with said liquid.

8. An apparatus according to claim 7, wherein said apparatus further comprises a first device for adding an acid solution to said liquid before said liquid is brought into contact with said photocatalyst.

9. An apparatus according to claim 8, wherein said apparatus further comprises a pH meter for measuring pH of said liquid, and wherein said first device comprises a means for changing an amount of said acid solution added to said liquid, in accordance with said pH measured by said pH meter, thereby adjusting said pH of said liquid.

10. An apparatus according to claim 9, wherein said means is configured such that said pH of said liquid is adjusted to not higher than 4.

11. An apparatus according to claim 7, wherein said apparatus further comprises a second device for removing a dissolved oxygen from said liquid by aerating said liquid with a gas that is free from oxygen.

12. An apparatus according to claim 11, wherein said apparatus further comprises a second section positioned upstream of said first section such that said dissolved oxygen is removed from said liquid by said second device in said second section and then said photocatalytic reaction is generated in said first section.

13. An apparatus according to claim 11, wherein said apparatus is configured such that said dissolved oxygen is removed from said liquid in said first section.

14. An apparatus according to claim 7, wherein said apparatus further comprises a third device for adding an agent to said liquid before said liquid is brought into contact with said photocatalyst, said agent eliminating holes that are produced together with electrons by said photocatalytic reaction.

15. A method for decomposing bromate ions contained in a liquid, said method comprising:

selecting a photocatalyst having an isoelectric point greater than or equal to the pH of said liquid;

bringing said liquid into contact with said photocatalyst; and irradiating said photocatalyst with a light ray having an energy that is not lower than that of a band gap of said photocatalyst, thereby generating a photocatalytic reaction to decompose said bromate ions.

16. A method for decomposing bromate ions contained in a liquid, said method comprising:

providing a photo catalyst;

making the pH of said liquid not higher than an isoelectric point of said photocatalyst;

bringing said liquid into contact with said photocatalyst; and irradiating said photocatalyst with a light ray having an energy that is not lower than that of a band gap of said photocatalyst, thereby generating a photocatalytic reaction to decompose said bromate ions.

17. A method according to claim 16, wherein said step of making comprises introducing an acid into said liquid.

* * * * *